United States Patent
Hasegawa et al.

(10) Patent No.: US 12,312,659 B2
(45) Date of Patent: May 27, 2025

(54) WEAR-RESISTANT MEMBER AND MECHANICAL DEVICE USING SAME

(71) Applicant: Hitachi, Ltd., Tokyo (JP)

(72) Inventors: Mitsuru Hasegawa, Tokyo (JP);
Tomonori Kimura, Tokyo (JP);
Masafumi Noujima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/009,211

(22) PCT Filed: Jun. 9, 2021

(86) PCT No.: PCT/JP2021/021882
§ 371 (c)(1),
(2) Date: Dec. 8, 2022

(87) PCT Pub. No.: WO2021/251423
PCT Pub. Date: Dec. 16, 2021

(65) Prior Publication Data
US 2023/0304132 A1 Sep. 28, 2023

(30) Foreign Application Priority Data

Jun. 9, 2020 (JP) .................. 2020-100223
Jun. 9, 2020 (JP) .................. 2020-100224

(51) Int. Cl.
*C22C 27/06* (2006.01)
*B23K 11/00* (2006.01)
*B32B 15/01* (2006.01)
*C23C 30/00* (2006.01)

(52) U.S. Cl.
CPC .............. *C22C 27/06* (2013.01); *B32B 15/01* (2013.01); *C23C 30/00* (2013.01); *B23K 11/0013* (2013.01)

(58) Field of Classification Search
CPC ......... C22C 27/06; C23C 30/00; B32B 15/01; B23K 11/0013
(Continued)

(56) References Cited

U.S. PATENT DOCUMENTS 5,314,659 A 5/1994 Hidaka et al.
2015/0284828 A1* 10/2015 Otobe ............... C22C 27/06
420/586

(Continued)

FOREIGN PATENT DOCUMENTS

CN 101592186 A * 12/2009
JP S53-079711 A 7/1978
(Continued)

OTHER PUBLICATIONS

Kujirai et al. "Simultaneous Determination of Trace Impurities in High-purity chromium Metal . . . ", Apr. 1993, Journal of Analytical Atomic Spectrometry vol. 8, pp. 481-485; URL: <https://citeseerx.ist.psu.edu/document?repid=rep1&type=pdf&doi=18bd66dab837fa7b0fb422363b24326ebb706dad> (Year: 1993).*

(Continued)

*Primary Examiner* — Katherine A Christy
(74) *Attorney, Agent, or Firm* — Foley & Lardner LLP

(57) ABSTRACT

A wear-resistant member contains a Cr-based alloy material. The Cr-based alloy material includes more than 40 mass % and 65 mass % or less of Cr, 15 mass % or more and 40 mass % or less of Ni, more than 0 mass % and 30 mass % or less of Fe, 5 mass % or more and 16 mass % or less of Nb, 0.1 mass % or more and 0.9 mass % or less of Ti, 0.6 mass % or more and 2.5 mass % or less of C, 2 mass % or less of Mn, and impurities. In the Cr-based alloy, a mass ratio Ti/Nb of the Nb and the Ti is 0.063 or less.

9 Claims, 13 Drawing Sheets

REFLECTED ELECTRON IMAGE

FERRITE PHASE: 77.5 AREA PERCENTAGE

Nb CARBIDE PHASE: 7.0 AREA PERCENTAGE

AUSTENITE PHASE: 15.5 AREA PERCENTAGE

(58) Field of Classification Search
USPC .......................................................... 428/666
See application file for complete search history.

(56) References Cited

U.S. PATENT DOCUMENTS

| | | |
|---|---|---|
| 2019/0071754 A1 | 3/2019 | Kimura et al. |
| 2019/0100825 A1* | 4/2019 | Kimura .................. C22F 1/11 |

FOREIGN PATENT DOCUMENTS

| | | | |
|---|---|---|---|
| JP | H04358054 A | * | 12/1992 |
| JP | H05-271841 A | | 10/1993 |
| JP | 2009-052084 A | | 3/2009 |
| JP | 2016-033451 A | | 3/2016 |
| WO | WO-2017/169056 A1 | | 10/2017 |
| WO | WO-2019/189531 A1 | | 10/2019 |

OTHER PUBLICATIONS

Nanba et al., JPH04358054A Google Patents machine translation printed on Jul. 31, 2024, Dec. 11, 1992, entire translation (Year: 1992).*

He et al., CN101592186A Google Patents Machine translation printed on Jan. 14, 2025, Dec. 2, 2009, entire translation (Year: 2009).*

English Translation of International Search Report issued in corresponding International Application No. PCT/JP2021/021882, dated Aug. 24, 2021.

* cited by examiner

FIG. 1
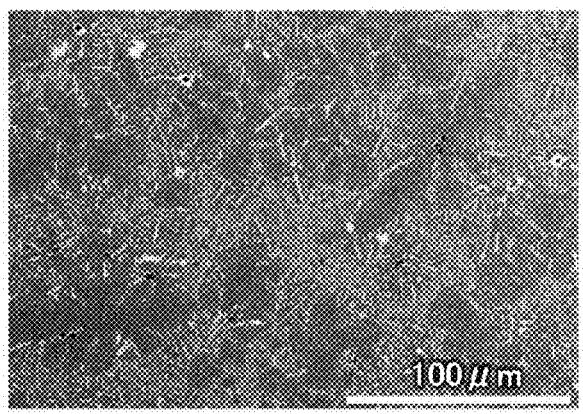
REFLECTED ELECTRON IMAGE
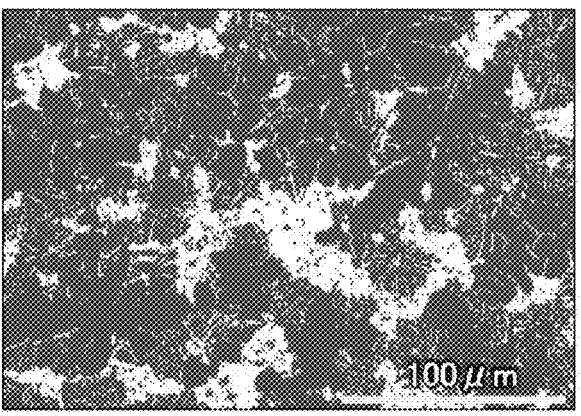
FERRITE PHASE: 77.5 AREA PERCENTAGE
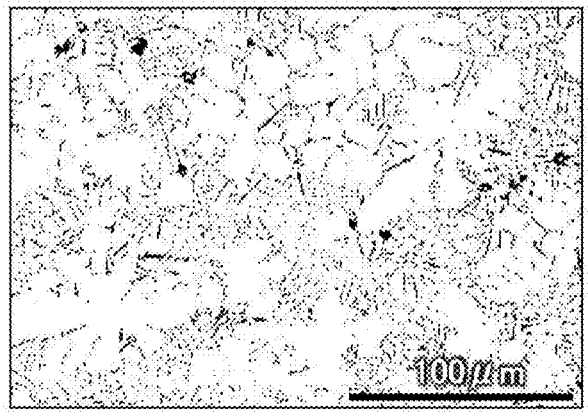
Nb CARBIDE PHASE: 7.0 AREA PERCENTAGE
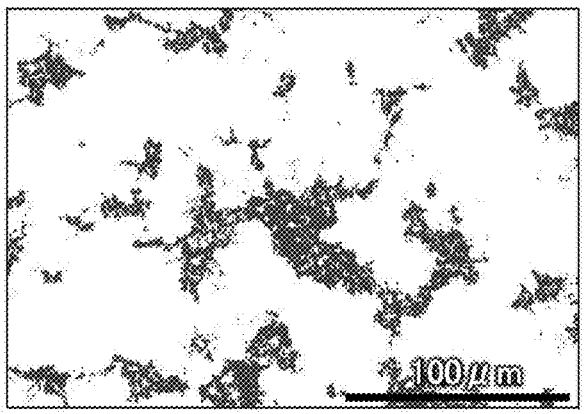
AUSTENITE PHASE: 15.5 AREA PERCENTAGE FIG. 14
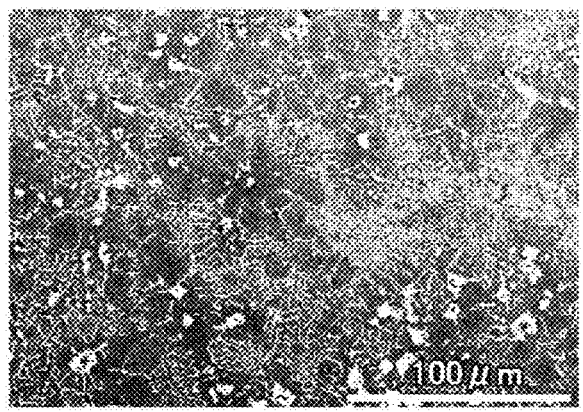
REFLECTED ELECTRON IMAGE
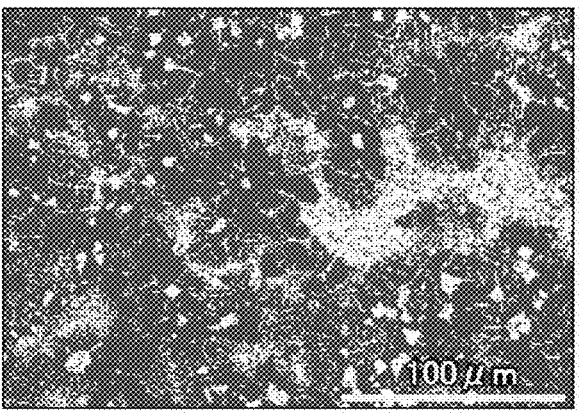
FERRITE PHASE: 77.4 AREA PERCENTAGE
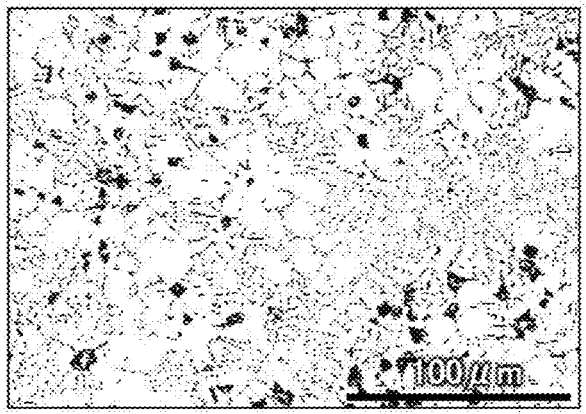
Nb CARBIDE PHASE: 12.0 AREA PERCENTAGE
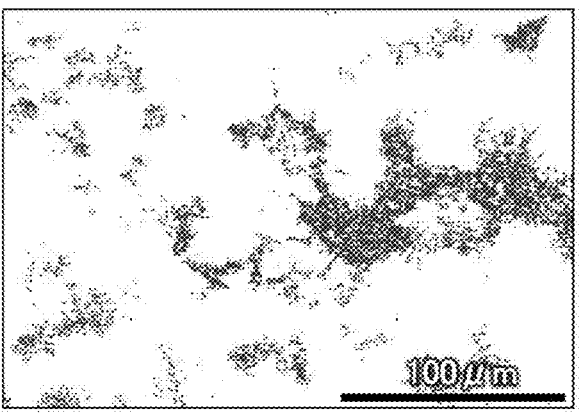
AUSTENITE PHASE: 10.5 AREA PERCENTAGE

TABLE A QUANTITATIVE ANALYSIS (POINT ANALYSIS) RESULTS OF ELEMENTS (UNIT: MASS%)

| ELEMENTS | Nb CARBIDE PHASE | | | γ PHASE | α PHASE |
|---|---|---|---|---|---|
| | SPECTRUM 1 | SPECTRUM 2 | SPECTRUM 3 | SPECTRUM 4 | SPECTRUM 5 |
| Cr | 1.85 | 2.78 | 1.91 | 39.2 | 55.1 |
| Ni | 0.91 | — | 0.83 | 36.7 | 25.9 |
| Fe | — | — | — | 18.4 | 15.2 |
| Nb | 76.4 | 74.8 | 77.2 | 1.64 | — |
| Ti | 3.64 | 3.57 | 3.79 | — | — |
| C | 17.2 | 18.9 | 16.1 | 4.10 | 3.78 |

REFLECTED ELECTRON IMAGE

--Prior art--

WEAR-RESISTANT MEMBER AND MECHANICAL DEVICE USING SAME

TECHNICAL FIELD

The present invention relates to a technique of a wear-resistant material, and particularly relates to a wear-resistant member using a Cr (chromium)-based alloy material and a mechanical device using the wear-resistant member.

BACKGROUND ART

In mechanical devices, a sliding member, a rolling member, and a valve member (e.g., a valve body and a valve seat) are very important members that influence the operation accuracy of the mechanical devices and strongly affect the maintenance cycle. The wear resistance of the sliding member, the rolling member, and the valve member is one of important characteristics related to the life of the members.

As a method of improving the wear resistance of a sliding member, a rolling member, and a valve member, there are a method of forming all the members from a material having excellent wear resistance, and a method of producing a sliding member, a rolling member, and a valve member by using a conventional material excellent in terms of mechanical strength, toughness, and cost as a base material, and forming a covering layer of a material having excellent wear resistance on sliding and rolling contact surfaces of the members, or a valve body surface or a valve seat surface.

As the material having excellent wear resistance, for example, a Co (cobalt)-based alloy material such as STELLITE (registered trademark) or TRIBALOY (registered trademark) has been widely used heretofore. However, Co is a relatively high-cost material, and thus there is a great demand for a cheaper material from the viewpoint of cost reduction.

As a material that can be expected to reduce the cost as compared with the Co-based alloy material, there is an alloy material containing Cr instead of Co. For example, PTL 1 (JP 2009-052084 A) discloses a metal mold member for resin molding, comprising an Ni—Cr—Al-based alloy having a component composition including, by mass %: more than 35 to 50% of Cr; 0.1 to 6% of Al (aluminum); more than 0.1 to 1% of Fe (iron); 0.001 to 0.015% of C (carbon); 0.01 to 0.2% of Si (silicon); 0.01 to 0.2% of Mn (manganese); 0.001 to 0.03% of Mg (magnesium); and 0.001 to 0.01% of N (nitrogen); and, as necessary, including more than 0.1 to 2% of (A) Mo (molybdenum) and more than 0.1 to 5% of (B) Cu (copper), wherein one or two of the above (A) and (B) are contained, the balance includes Ni (nickel) and inevitable impurities, and an amount of S (sulfur) contained as the inevitable impurities is adjusted to 0.005% or less and an amount of O (oxygen) is adjusted to 0.003% or less.

In addition, PTL 2 (JP H5-271841 A) discloses a high toughness Cr-based alloy for hard facing, comprising: 30.0 to 48.0 wt % of Ni; 1.5 to 15.0 wt % of W (tungsten); and/or 1.0 to 6.5 wt % of Mo, a total of W and Mo being 15.0 wt % or less, the alloy further including one or two or more of Fe, Co, C, B (boron), Al, Si, Nb (niobium), and Ti (titanium) as necessary, further including 0.01 to 0.12 wt % of one or two or more of Al, Y (yttrium), misch metal, Ti, Zr (zirconium), and Hf (hafnium) as necessary in the case of a powder used for powder buildup welding, and additionally including 0.01 to 0.1 wt % of O as necessary, the balance being 40 wt % or more of Cr.

CITATION LIST

Patent Literature

PTL 1: JP 2009-052084 A
PTL 2: JP H5-271841 A

SUMMARY OF INVENTION

Technical Problem

The metal mold member for resin molding including an Ni—Cr—Al-based alloy in PTL 1 has excellent corrosion resistance to hydrogen fluoride, and has hardness substantially equivalent to that of the conventional metal mold member for resin molding. It is considered that the use of a mold made of the Ni—Cr—Al-based alloy enables the consumption of the mold during molding of a resin (particularly, a fluorine resin) to be suppressed as compared with that in the past.

It is considered that the high toughness Cr-based alloy for hard facing of PTL 2 has toughness, wear resistance, corrosion resistance, and powder buildup weldability superior to conventional materials. Further, it is considered that the alloy may be used as a sintered component by powder metallurgy or a cast component by precision casting.

However, in recent years, there is an increasing demand for performance improvement and efficiency improvement of mechanical devices, and the level of demand for sliding member, rolling member, and valve member is inevitably higher than that in the past. As a matter of course, cost reduction of the sliding, rolling, and valve members is one of the most important issues.

In view of these matters, an object of the present invention is to provide a wear-resistant member using a Cr-based alloy material that does not contain a Co component (i.e., in which the cost can be reduced as compared with the Co-based alloy material) and has wear resistance equal to or more than that of the conventional Co-based alloy material, and a mechanical device using the wear-resistant member.

Solution to Problem (I) One aspect of the present invention is to provide a wear-resistant member using a Cr-based alloy material, in which the Cr-based alloy material has an alloy composition including:
more than 40 mass % and 65 mass % or less of Cr;
15 mass % or more and 40 mass % or less of Ni;
more than 0 mass % and 30 mass % or less of Fe;
5 mass % or more and 16 mass % or less of Nb;
0.1 mass % or more and 0.9 mass % or less of Ti;
0.6 mass % or more and 2.5 mass % or less of C;
2 mass % or less of Mn; and
impurities, and
in which a mass ratio Ti/Nb of the Nb and the Ti is 0.063 or less.

In the present invention, the wear-resistant member (I) according to the present invention can be improved and modified as follows.

(i) The Cr-based alloy material has a ferrite phase as a main phase, and an Nb carbide phase having a dendritic and granular form is precipitated in a total area percentage of 4% or more and 30% or less.

(ii) In the alloy composition, a content rate of the Ni is higher than a content rate of the Fe, and a mass ratio C/Nb of the Nb and the C is 0.11 or more and 0.16 or less, and the mass ratio Ti/Nb is 0.0062 or more.

(iii) The alloy composition further includes at least one of: 0.1 mass % or more and 5 mass % or less of Cu; 0.1 mass % or more and 1 mass % or less of Si; 0.02 mass % or more and 0.3 mass % or less of Sn (tin); and 0.005 mass % or more and 0.05 mass % or less of Al.

(iv) The wear-resistant member is entirely formed of the Cr-based alloy material.

(v) The wear-resistant member is obtained by forming a covering layer including the Cr-based alloy material on a metal base material, and a surface layer region of the covering layer has the alloy composition.

(vi) The covering layer has a thickness of 2 mm or more and 20 mm or less.

(vii) The covering layer is a buildup-welded layer.

(viii) The metal base material is made of a steel material.

(ix) The wear-resistant member is a sliding member, a rolling member, or a valve member.

(II) Another aspect of the present invention is to provide a mechanical device including: a sliding member; a rolling member; or a valve member, in which the sliding member, the rolling member, or the valve member is the wear-resistant member described above.

Advantageous Effects of Invention

According to the present invention, it is possible to provide a wear-resistant member using a Cr-based alloy material that does not contain a Co component (i.e., in which the cost can be reduced as compared with the Co-based alloy material) and has wear resistance equal to or more than that of the conventional Co-based alloy material, and a mechanical device using the wear-resistant member.

BRIEF DESCRIPTION OF DRAWINGS

FIG. 1 shows scanning electron microscope (SEM) observation images showing an example of a cross-sectional microstructure of a wear-resistant member in the present invention, and the images are a reflected electron image, a ferrite phase map, an Nb carbide phase map, and an austenite phase map, respectively.

FIG. 14 shows SEM observation images showing an example of a cross-sectional microstructure in a test evaluation sample of Example 2, and the images are a reflected electron image, a ferrite phase map, an Nb carbide phase map, and an austenite phase map, respectively.

DESCRIPTION OF EMBODIMENTS

Figure 2:
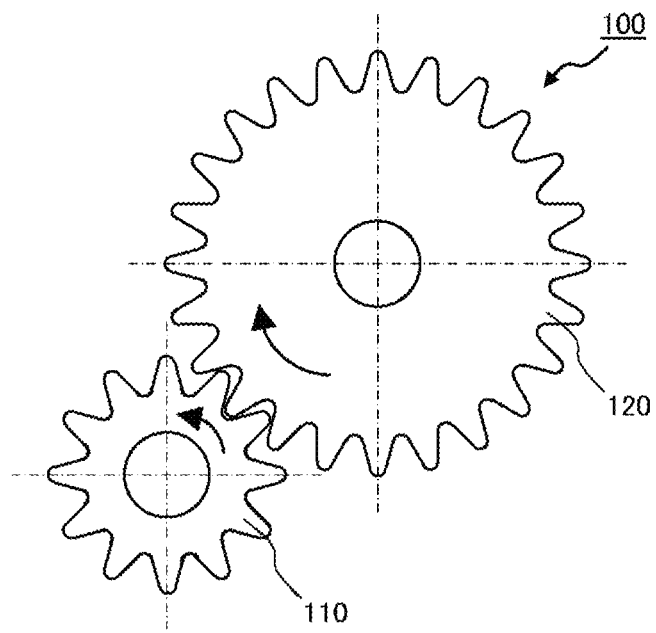
FIG. 2 is a schematic cross-sectional view illustrating a power transmission device as an example of a mechanical device according to the present invention.

The present inventors have extensively conducted studies on the relationship among the chemical composition, metal structure form, and wear resistance of a member using a Cr-based alloy material which does not contain Co, but contains Cr as a main component (component having the maximum content rate), particularly a Cr-based alloy material which contains more than 40 mass % of Cr, and completed the present invention.

Hereinafter, embodiments of the present invention will be specifically described with reference to the drawings. The present invention is not limited to the embodiments described herein, and can be appropriately combined with or improved based on a known technique without departing from the technical idea of the invention.

[Chemical Composition of Cr-Based Alloy Material]

As described above, the Cr-based alloy material used in the present invention is an alloy that contains Cr as a component with the maximum content rate, and is also an alloy that contains essential components: Ni, Fe, Nb, Ti, and C, in addition to Cr, an optional component: Mn, and impurities. Further, one or more of additional optional components: Cu, Si, Sn, and Al may be further contained. The total content rate of impurities is preferably 1 mass % or less. In other words, the total amount of components intentionally contained is preferably 99 mass % or more.

When the target wear-resistant member is a member in which a covering layer is formed on a metal base material, and the metal base material and the covering layer are dissimilar alloys (alloys having compositions different from each other), interdiffusion of alloy components may occur in the vicinity of the interface between the covering layer and the metal base material in the process of forming the covering layer, and there is a possibility that the chemical composition in the vicinity of the interface may deviate from the original chemical composition.

However, since the effective diffusion time (time during which substantial diffusion occurs) is usually very short in formation of the covering layer, the influence of diffusion becomes extremely small as the thickness of the covering layer is increased (e.g., by multilayering the covering layer). When the wear resistance is discussed as in the present invention, the characteristics of the surface layer region of the member are important. Thus, in discussion of the covering layer, the surface layer region of the covering layer (e.g., a region of 10% of the covering layer thickness from the outermost surface of the covering layer) is targeted.

Hereinafter, the composition (each component) of the Cr-based alloy material used in the present invention will be described. The remaining components other than the elements described below are impurities that are difficult to control.

Cr: More than 40 mass % and 65 mass % or less

The Cr component is a component containing the Cr-based alloy material of the present invention with the maximum content rate and is cheaper than Co, so it is advantageous in that the material cost can be reduced as compared with the conventional Co-based alloy material. In addition, containing Cr as a component with the maximum content rate also produces an effect such that a passive oxide film is easily formed on the surface of the Cr-based alloy material, and the corrosion resistance is improved.

The content rate of the Cr is preferably more than 40 mass %, more preferably 45 mass % or more, and still more preferably 50 mass % or more. When the content rate of the Cr is 40 mass % or less, the cost reduction effect is weakened, and the effect of improving corrosion resistance is not sufficient. Meanwhile, when the content rate of the Cr is more than 65 mass %, the melting point of the alloy becomes too high and the manufacturability of the Cr-based alloy material is deteriorated (production cost is increased), and thus the Cr content is preferably 65 mass % or less.

Ni: 15 mass % or more and 40 mass % or less

The Ni component is one of the main components constituting a parent phase (a ferrite phase or a mixed phase of ferrite and austenite phases) of the Cr-based alloy material of the present invention, and is a component contributing to the improvement in ductility and toughness of the parent phase. The content rate of the Ni is preferably lower than the content rate of the Cr described above and higher than the content rate of the Fe described later. Specifically, the content rate of the Ni is preferably 15 mass % or more, more preferably 20 mass % or more, and still more preferably 25 mass % or more. When the content rate of the Ni is less than 15 mass %, the ductility and toughness of the Cr-based alloy material become insufficient. Meanwhile, when the content rate of the Ni is more than 40 mass %, the wear resistance of the Cr-based alloy material becomes insufficient, and thus the content rate of the Ni is preferably 40 mass % or less.

Fe: More than 0 mass % and 30 mass % or less

The Fe component is also one of the main components constituting the parent phase of the Cr-based alloy material of the present invention, and is a component contributing to securing toughness and hardness. The content rate of the Fe is preferably more than 0 mass %, more preferably 10 mass % or more, and still more preferably 15 mass % or more. When the Cr-based alloy material does not contain any Fe component (when the content rate of the Fe is 0 mass %), the wear resistance of the Cr-based alloy material becomes insufficient. Meanwhile, the content rate of the Fe is preferably 30 mass % or less, more preferably 20 mass % or less, and still more preferably 17 mass % or less. When the content rate of the Fe is more than 30 mass %, a σ phase (an intermetallic compound phase based on a FeCr phase), which is a brittle intermetallic compound, is likely to be formed, and the ductility and toughness of the Cr-based alloy material are significantly reduced (so-called σ phase embrittlement).

Nb: 5 mass % or more and 16 mass % or less

The Nb component is an important component that chemically combines with the C component to be described later to form and precipitate an Nb carbide phase (e.g., an NbC phase), and contributes to improvement in the hardening and wear resistance of the Cr-based alloy material. Further, the Nb component solid-solved in the parent phase also has an effect of contributing to improvement of toughness. The content rate of the Nb is preferably 5 mass % or more, and more preferably 6 mass % or more. When the content rate of the Nb is less than 5 mass %, the improvement in the hardening and wear resistance of the Cr-based alloy material becomes insufficient. Meanwhile, the content rate of the Nb is preferably 16 mass % or less, and more preferably 12 mass % or less. When the content rate of the Nb is more than 16 mass %, the ductility and toughness of the Cr-based alloy material become insufficient.

In addition, the mass ratio C/Nb of the content rate of the Nb and the content rate of the C to be described later is preferably 0.11 or more and 0.16 or less, and more preferably 0.12 or more and 0.14 or less. When the mass ratio C/Nb is less than 0.11, the amount of the Nb carbide phase formed is insufficient, and the effect of improving the hardening and wear resistance of the Cr-based alloy material becomes insufficient. When the mass ratio C/Nb is more than 0.16, a Cr carbide phase (e.g., a $Cr_7C_3$ phase or a $Cr_{23}C_6$ phase) is formed and precipitated by an excessive amount of C component, causing a decrease in corrosion resistance of the Cr-based alloy material.

C: 0.6 mass % or more and 2.5 mass % or less

The C component is an important component that chemically combines with the above-described Nb component to form and precipitate an Nb carbide phase, and contributes to improvement in the hardening and wear resistance of the Cr-based alloy material. Further, the C component also has an effect of contributing to the hardening of the Cr-based alloy material even when the C component is solid-solved in the parent phase. The content rate of the C is preferably 0.6 mass % or more, and more preferably 0.7 mass % or more. When the content rate of the C is less than 0.6 mass %, the improvement in the hardening and wear resistance of the Cr-based alloy material becomes insufficient. Meanwhile, the content rate of the C is preferably 2.5 mass % or less, more preferably 2 mass % or less, and still more preferably 1.5 mass % or less. When the content rate of the C is more than 2.5 mass %, the Cr carbide phase is excessively formed/precipitated, causing a decrease in corrosion resistance of the Cr-based alloy material.

As described above, the mass ratio C/Nb of the content rate of the C and the content rate of the Nb is preferably 0.11 or more and 0.16 or less, and more preferably 0.12 or more and 0.14 or less.

Ti: 0.1 mass % or more and 0.9 mass % or less

The Ti component is a component that chemically combines with oxygen in the Cr-based alloy material to form fine Ti oxide particles, and plays a role of trapping and stabilizing an excessive amount of oxygen which does not contribute to the positive effect (so-called role of deoxygenation). Additionally, the Ti oxide particles dispersed and formed serve as a starting point (species) for formation of the Nb carbide phase, and have an effect of contributing to fine dispersion/precipitation of the Nb carbide phase. The present invention does not deny that there is a possibility that a part of the Ti component forms a carbide (e.g., TiC or (Nb,Ti)C).

The content rate of the Ti is preferably 0.1 mass % or more, and more preferably 0.2 mass % or more. When the content rate of the Ti is less than 0.1 mass %, the amount of Ti oxide particles formed is insufficient, and thus the fine dispersion/precipitation of the Nb carbide phase becomes insufficient (large lump-like Nb carbide phase particles are likely to be precipitated). As a result, the improvement in the hardening and wear resistance of the Cr-based alloy material becomes insufficient. Meanwhile, the content rate of the Ti is preferably 0.9 mass % or less, more preferably 0.7 mass % or less, and still more preferably 0.5 mass % or less. When the content rate of the Ti is more than 0.9 mass %, the Ti oxide particles are likely to be coarsened, and are likely to be unevenly distributed on the surface of the solidified Cr-based alloy material together with the Nb carbide phase. This causes a decrease in the corrosion resistance or wear resistance of the wear-resistant member.

In addition, the mass ratio Ti/Nb of the content rate of the Ti and the content rate of the Nb is preferably 0.0062 or more and 0.063 or less, and more preferably 0.01 or more and 0.05 or less. When the mass ratio Ti/Nb is less than 0.0062, the lump-like Nb carbide phase particles are likely to be coarsened. When the mass ratio Ti/Nb is more than 0.063, the content rate of the Ti in the Nb carbide phase particles increases, and the Nb carbide phase particles are likely to be unevenly distributed on the surface of the solidified Cr-based alloy material.

Mn: 2 mass % or less

The Mn component is an optional component of the Cr-based alloy material, and is a component that chemically combines with sulfur or oxygen to form fine particles of the compound and plays a role of trapping and stabilizing an excessive amount of sulfur or oxygen which does not contribute to the positive effect (so-called role of desulfurization/deoxygenation). The trapping and stabilizing of sulfur or oxygen contribute to the improvement in the corrosiveness, ductility and toughness of the Cr-based alloy material.

Although Mn is not an essential component (the content rate may be 0 mass %), the content rate of the Mn is preferably 0.05 mass % or more to reliably exhibit the effect of containing Mn. Meanwhile, the content rate of the Mn is preferably 2 mass % or less, more preferably 1 mass % or less, and still more preferably 0.5 mass % or less. When the content rate of the Mn is more than 2 mass %, coarse particles of a sulfide (e.g., MnS) are formed to cause a decrease in the corrosion resistance, ductility and toughness of the Cr-based alloy material.

Impurities: 1 mass % or less in total

Typical impurities in the Cr-based alloy material of the present invention include N, O, P, S, and Ta. Next, these impurities will be briefly described.

N: 0.04 mass % or less

The N component is an impurity component that lowers mechanical characteristics (e.g., ductility and toughness) of the Cr-based alloy material in a case where the N component chemically combines with a constituent of the Cr-based alloy material to form coarse particles of a nitride phase (e.g., a Cr nitride phase). Meanwhile, controlling of the content rate of the N to 0.04 mass % or less makes it possible to cause the component to be solid-solved in the parent phase or to form fine particles of the nitride phase, and there is also yielded an effect of improving mechanical characteristics (e.g., hardness).

O: 0.02 mass % or less

The O component is an impurity component that lowers mechanical characteristics (e.g., ductility and toughness) of the Cr-based alloy material in a case where the O component chemically combines with a constituent of the Cr-based alloy material to form coarse particles of oxide phase (e.g., Fe oxide). Meanwhile, controlling of the content rate of the O to 0.02 mass % or less makes it possible to form fine particles of the oxide phase, and there is also yielded an effect of improving mechanical characteristics (e.g., hardness).

P: 0.04 mass % or less

The P component is an impurity component that is likely to segregate at the crystal grain boundary of the Cr-based alloy material and lowers mechanical characteristics (e.g., ductility and toughness) or corrosion resistance of the crystal grain boundary. Controlling of the content rate of the P to 0.04 mass % or less makes it possible to suppress these negative effects.

S: 0.005 mass % or less

The S component is an impurity component that is likely to chemically combine with a constituent of the Cr-based alloy material to form a sulfide (e.g., Fe sulfide) having a relatively low melting point, and lowers the mechanical characteristics or corrosion resistance of the Cr-based alloy material. Controlling of the content rate of the S to 0.005 mass % or less makes it possible to suppress these negative effects.

Ta: 0.2 mass % or less

The Ta component is one component contained in niobium ore (e.g., pyrochlore), and is an impurity component that is likely to be mixed into the Nb raw material. When the content rate of the Ta is 0.2 mass % or less, there is no particular adverse effect. In other words, the Ta component is a component which is not actively added, and whose acceptable amount is 0.2 mass % or less.

Additional Optional Components

As described above, the Cr-based alloy material of the present invention may further contain one or more of additional optional components: Cu, Si, Sn, and Al. Next, these additional optional components will be briefly described.

Cu: 0.1 mass % or more and 5 mass % or less

The Cu component is one of the additional optional components in the Cr-based alloy material, and is a component contributing to the improvement in corrosion resistance. When Cu is contained, the content rate of the Cu is preferably 0.1 mass % or more and 5 mass % or less. When the content rate of the Cu is less than 0.1 mass %, it is only difficult to clarify the effect based on Cu (no particular problem occurs). Meanwhile, when the content rate of the Cu is more than 5 mass %, a Cu precipitate is likely to be formed. This causes a decrease in the ductility and toughness of the Cr-based alloy material.

Si: 0.1 mass % or more and 1 mass % or less

The Si component is also one of the additional optional components in the Cr-based alloy material, and is a component that plays a role of deoxygenation. When Si is contained, the content rate of the Si is preferably 0.1 mass % or more and 1 mass % or less. When the content rate of the Si is less than 0.1 mass %, it is only difficult to clarify the effect based on Si (no particular problem occurs). Meanwhile, when the content rate of the Si is more than 1 mass %, coarse particles of an oxide (e.g., $SiO_2$) are formed. This causes a decrease in the ductility and toughness of the Cr-based alloy material.

Sn: 0.02 mass % or more and 0.3 mass % or less

The Sn component is also one of the additional optional components in the Cr-based alloy material, and is a component that plays a role of strengthening of the passive film on the surface of the Cr-based alloy material and contributes to the improvement in corrosion resistance (e.g., resistance to chloride ions or acidic corrosive environments). When Sn is contained, the content rate of the Sn is preferably 0.02 mass % or more and 0.3 mass % or less. When the content rate of the Sn is less than 0.02 mass %, it is only difficult to clarify the effect based on Sn (no particular problem occurs). Meanwhile, when the content rate of the Sn is more than 0.3 mass %, the Sn component segregates at the grain boundary. This causes a decrease in the ductility and toughness of the Cr-based alloy material.

Al: 0.005 mass % or more and 0.05 mass % or less

The Al component is also one of the additional optional components in the Cr-based alloy material, and is a component contributing to the improvement in deoxygenation when combined with Mn or Si. When Al is contained, the content rate of the Al is preferably 0.005 mass % or more and 0.05 mass % or less. When the content rate of the Al is less than 0.005 mass %, it is only difficult to clarify the effect based on Al (no particular problem occurs). Meanwhile, when the content rate of the Al is more than 0.05 mass %, coarse particles of an oxide or a nitride (e.g., $Al_2O_3$ or AlN) are formed. This causes a decrease in the ductility and toughness of the Cr-based alloy material.

[Microstructure of Wear-Resistant Member]

FIG. 1 shows scanning electron microscope (SEM) observation images showing an example of a cross-sectional microstructure of a Cr-based alloy material in the present invention, and the images are a reflected electron image, a ferrite phase map, an Nb carbide phase map, and an austenite phase map, respectively. As shown in FIG. 1, in the Cr-based alloy material of the present invention, the parent phase includes a mixed phase of a ferrite and an austenite phase, and the Nb carbide phase is dispersed and precipitated in the parent phase. When the ratio of the phases is investigated, the ferrite phase has an area percentage of 77.5%, the austenite phase has an area percentage of 15.5%, and the Nb carbide phase has an area percentage of 7.0%.

When the reflected electron image and the Nb carbide phase map are observed in detail, the Nb carbide phase is mainly precipitated in a dendritic/leaf vein form, and is precipitated in a granular form in some places. In other words, it can be seen that the Nb carbide phase is finely dispersed and precipitated over the entire parent phase. It is considered that the Cr-based alloy material in the present invention exhibits excellent wear resistance due to the fine dispersion/precipitation of the Nb carbide phase.

When the cross-sectional microstructure of the Cr-based alloy material is observed, the area percentage of the Nb carbide phase precipitated is preferably 4% or more and 30% or less, and more preferably 5% or more and 20% or less. When the area percentage of the Nb carbide phase precipitated is less than 4%, the effect of improving the wear resistance of the Cr-based alloy material cannot be sufficiently produced. Meanwhile, when the area percentage of the Nb carbide phase precipitated is more than 30%, the Nb carbide phase in a coarse granular form is likely to be precipitated, and the ductility and toughness of the Cr-based alloy material become insufficient.

[Wear-Resistant Member and Mechanical Device]

FIG. 2 is a schematic cross-sectional view illustrating a power transmission device as an example of a mechanical device according to the present invention. As illustrated in FIG. 2, a first gear 110 and a second gear 120 including the Cr-based alloy material of the present invention (each being the wear-resistant member according to the present invention) are combined, thereby forming a gear mechanism 100 having excellent wear resistance. Although FIG. 2 illustrates the gear mechanism by a spur gear, the power transmission device according to the present invention is not limited to the spur gear, and may be another gear (e.g., an internal gear, a helical gear, a screw gear, a bevel gear, etc.).

Figure 3:
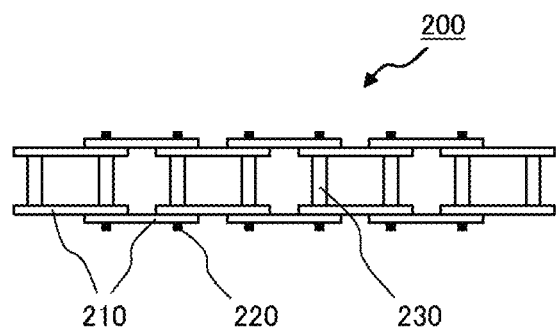
FIG. 3 is a schematic cross-sectional view illustrating another power transmission device as an example of the mechanical device according to the present invention.

FIG. 3 is a schematic cross-sectional view illustrating another power transmission device as an example of the mechanical device according to the present invention. As illustrated in FIG. 3, the use of a chain plate 210, a chain pin 210, and a chain roller 230 including the Cr-based alloy material of the present invention (each being one type of the wear-resistant member according to the present invention) allows for the formation of a roller chain 200 having excellent wear resistance.

Figure 4:
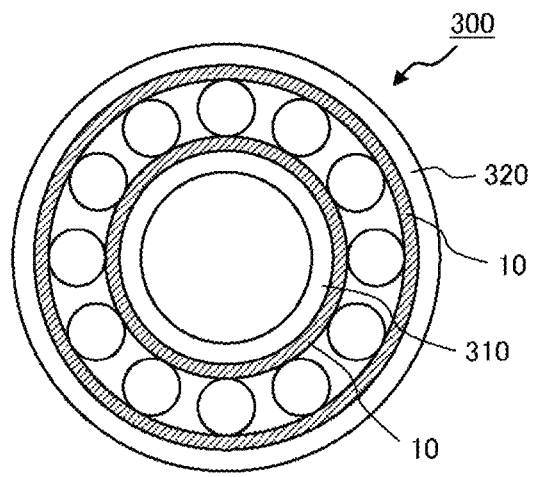
FIG. 4 is a schematic cross-sectional view illustrating a bearing device as an example of the mechanical device according to the present invention.

FIG. 4 is a schematic cross-sectional view illustrating a bearing device as an example of the mechanical device according to the present invention. As illustrated in FIG. 4, the use of a bearing inner ring 310 and a bearing outer ring 320, each having a covering layer 10 including the Cr-based alloy material of the present invention on its rolling contact surface, (each being one type of the wear-resistant member according to the present invention) allows for the formation of a bearing device 300 having excellent wear resistance. Although FIG. 4 illustrates the bearing device, the bearing device according to the present invention is not limited to the bearing device, and may be a slide bearing device.

Figure 5:
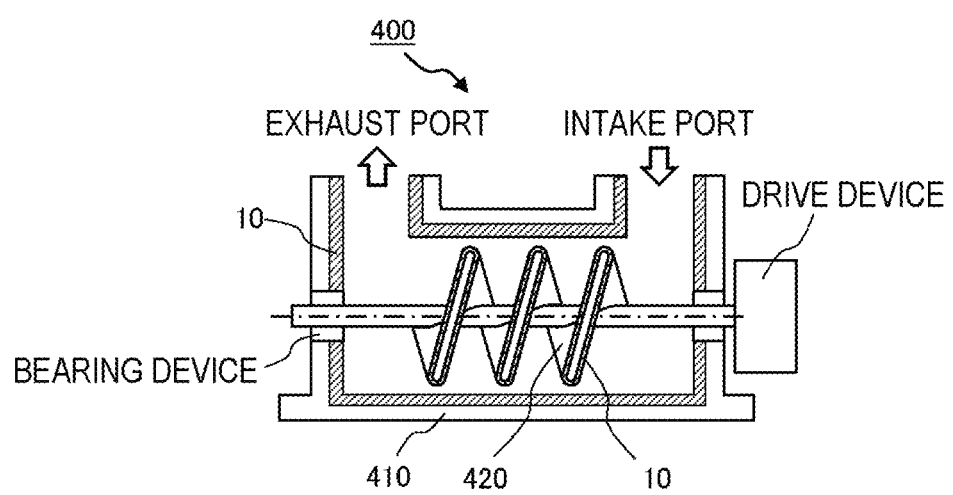
FIG. 5 is a schematic cross-sectional view illustrating a fluid device as an example of the mechanical device according to the present invention.

FIG. 5 is a schematic cross-sectional view illustrating a fluid device as an example of the mechanical device according to the present invention. As illustrated in FIG. 5, the use of a flow path member 410 in which the covering layer 10 including the Cr-based alloy material is provided on an inner surface and an impeller 420 in which the covering layer 10 including the Cr-based alloy material is provided on an outer surface (each being one type of the wear-resistant member according to the present invention) allows for the formation of a pump device 400 having excellent wear resistance. In the fluid device according to the present invention, the fluid substance is not particularly limited, and may be, for example, a gas, a liquid, a powder, or a fluid in which two or more of them are mixed. Further, the bearing device 300 may be used as a bearing of a rotary shaft of the impeller 420.

Figure 6:
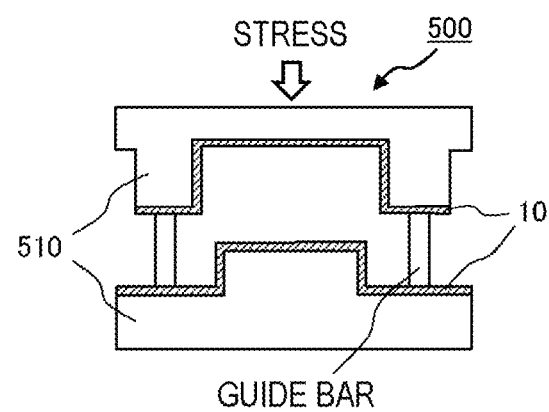
FIG. 6 is a schematic cross-sectional view illustrating a machine tool device as an example of the mechanical device according to the present invention.

FIG. 6 is a schematic cross-sectional view illustrating a machine tool device as an example of the mechanical device according to the present invention. As illustrated in FIG. 6, the use of a mold 510 (one type of the wear-resistant member according to the present invention) in which the covering layer 10 including the Cr-based alloy material is provided on an action surface (surface in contact with a processed surface) allows for the formation of a molding device 500 having excellent wear resistance.

Figure 7:
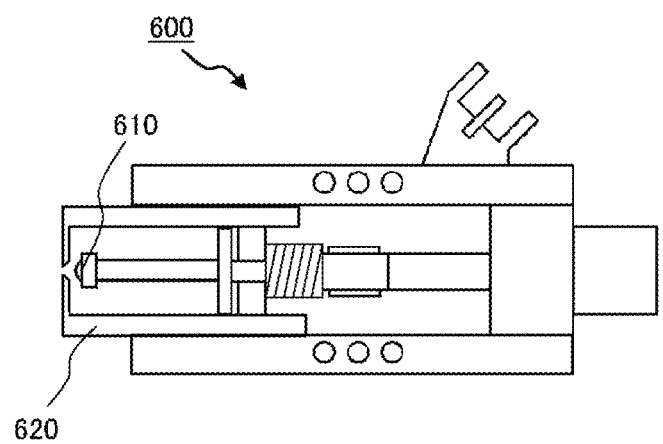
FIG. 7 is a schematic cross-sectional view illustrating a valve device as an example of the mechanical device according to the present invention.

FIG. 7 is a schematic cross-sectional view illustrating a valve device as an example of the mechanical device according to the present invention. As illustrated in FIG. 7, the use of a fuel injection valve 610 and a fuel injection valve seat body 620 using the Cr-based alloy material of the present invention (each of them is one type of the wear-resistant member according to the present invention) allows for the formation of a fuel injection device 600 having excellent wear resistance. Each of the fuel injection valve 610 and the fuel injection valve seat body 620 may have a structure in which the covering layer including the Cr-based alloy material is formed on a metal base material, or may be formed of the Cr-based alloy material alone.

Figure 8A:
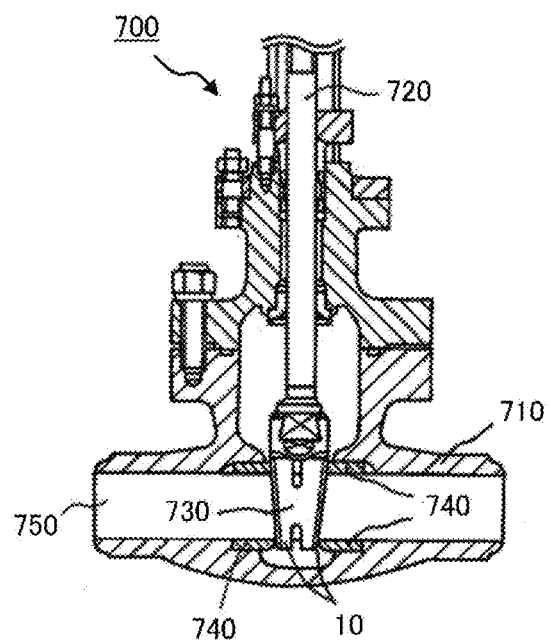
FIG. 8A is a schematic cross-sectional view illustrating another valve device as an example of the mechanical device according to the present invention.
Figure 8B:
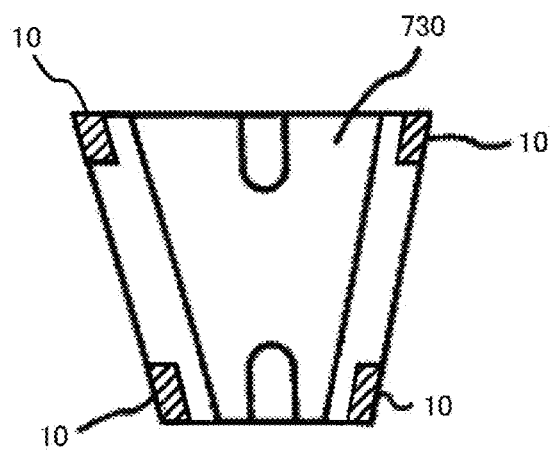
FIG. 8B is an enlarged schematic cross-sectional view of a valve body of the valve device of FIG. 8A.
Figure 8C:
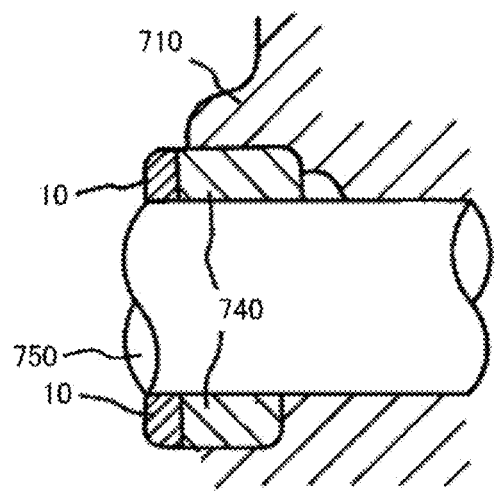
FIG. 8C is an enlarged schematic cross-sectional view of a valve seat of the valve device of FIG. 8A.

FIG. 8A is a schematic cross-sectional view illustrating another valve device as an example of the mechanical device according to the present invention, FIG. 8B is an enlarged schematic cross-sectional view of a valve body of the valve device of FIG. 8A, and FIG. 8C is an enlarged schematic cross-sectional view of a valve seat of the valve device of FIG. 8A.

As illustrated in FIG. 8A, in a valve device 700, a valve rod 720 is disposed in a valve box 710, and a valve body 730 is disposed at an end of the valve rod 720. The mechanism is such that when the valve body 730 is inserted into or removed from valve seats 740, the fluid in a flow path 750 flows or stops flowing. More specifically, as illustrated in FIGS. 8B and 8C, the covering layers 10 including the Cr-based alloy material are formed at portions where the valve body 730 slides on or is sealed with the valve seats 740 (each being one type of the wear-resistant member according to the present invention). As a result, the valve device 700 having excellent wear resistance is obtained.

Figure 9:
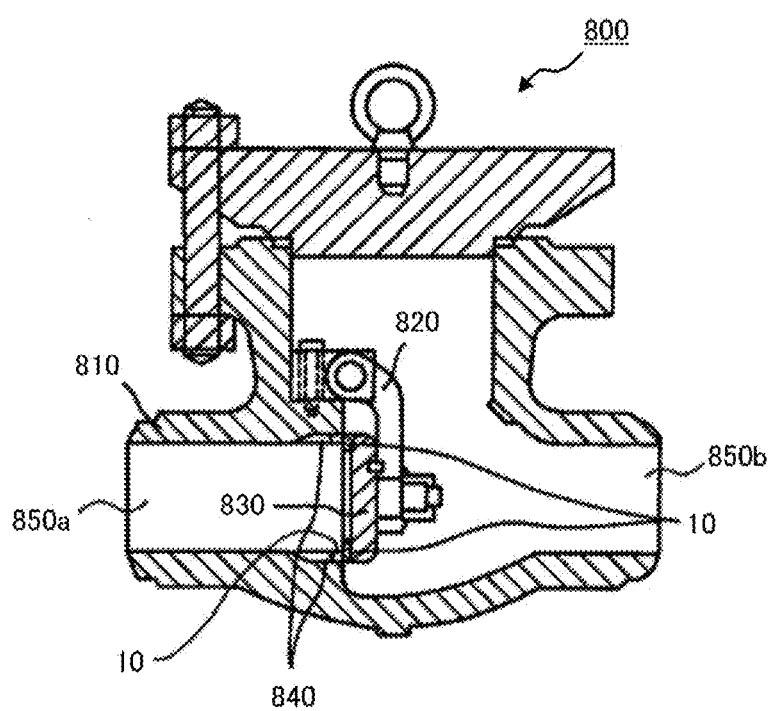
FIG. 9 is a schematic cross-sectional view illustrating another valve device as an example of the mechanical device according to the present invention.

FIG. 9 is a schematic cross-sectional view illustrating another valve device as an example of a mechanical device according to the present invention. A valve device 800 of FIG. 9 is a check valve, and, in a valve box 810, a valve body 830 is disposed at an end of a valve body support 820 rotatably attached to the valve box 810. The mechanism is such that the valve body 830 opens and the fluid flows in the direction from a flow path 850a toward a flow path 850b, whereas the valve body 830 closes with respect to annular valve seats 840 disposed at an end of the flow path 850a to stop the fluid flowing in the direction from the flow path 850b toward the flow path 850a. The valve body 830 and the valve seats 840 (each being one type of the wear-resistant member according to the present invention) have the covering layers 10 including the Cr-based alloy material formed at portions in contact with each other. As a result, the valve device 800 having excellent wear resistance is obtained.

Figure 10:
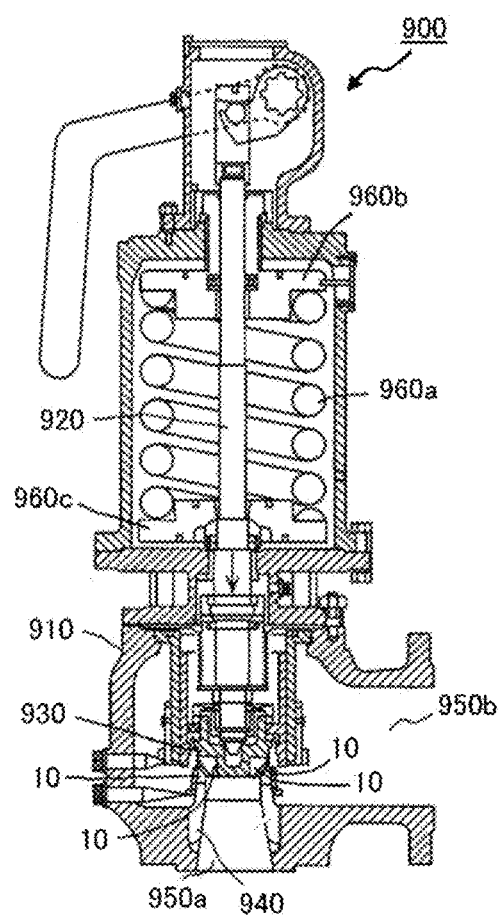
FIG. 10 is a schematic cross-sectional view illustrating another valve device as an example of the mechanical device according to the present invention.

FIG. 10 is a schematic cross-sectional view illustrating another valve device as an example of a mechanical device according to the present invention. A valve device 900 of FIG. 10 is an open safety valve, and a valve body 930 is pressed against valve seats 940 by a pressing mechanism (a pressing spring 960a, an upper spring bearing 960b, and a lower spring bearing 960c) via a valve rod 920 in a valve box 910. When the pressure of the fluid in a flow path 950a exceeds the pressure of the pressing mechanism, the valve body 930 is opened (pushed up) to release the fluid to a flow path 950b. The valve body 930 and the valve seats 940 (each being one type of the wear-resistant member according to the present invention) have the covering layers 10 including the Cr-based alloy material formed at portions in contact with each other. As a result, the valve device 900 having excellent wear resistance is obtained.

Figure 11:
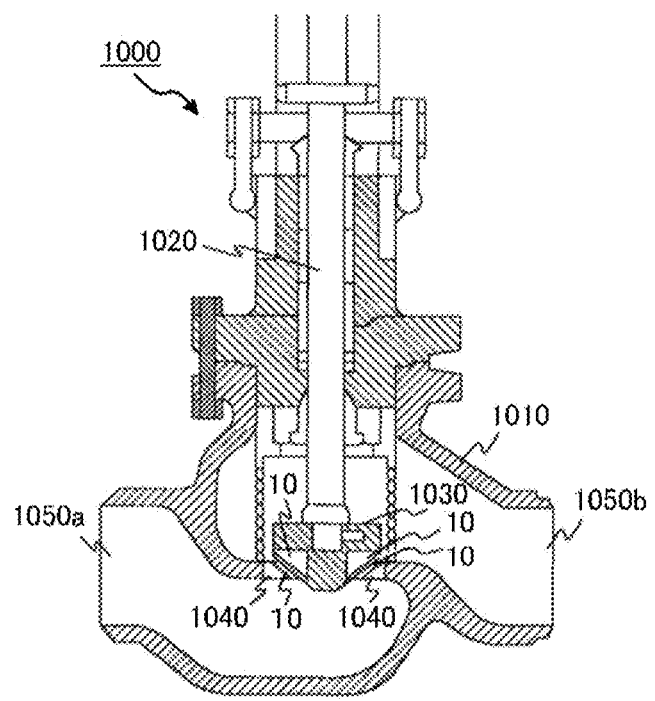
FIG. 11 is a schematic cross-sectional view illustrating another valve device as an example of a mechanical device according to the present invention.

FIG. 11 is a schematic cross-sectional view illustrating another valve device as an example of a mechanical device according to the present invention. A valve device 1000 of FIG. 11 is a ball-type valve, a valve rod 1020 is disposed in a valve box 1010, and a valve body 1030 is disposed at an end of the valve rod 1020. The mechanism is such that when the valve body 1030 is loaded and sealed with respect to valve seats 1040, the fluid in a flow path 1050a is stopped, whereas when the valve body 1030 is unloaded and opened with respect to the valve seats 1040, the fluid in the flow path 1050a flows through a flow path 1050b. The valve body 1030 and the valve seats 1040 (each being one type of the wear-resistant member according to the present invention) have the covering layers 10 including the Cr-based alloy material formed at portions in contact with each other. As a result, the valve device 1000 having excellent wear resistance is obtained.

[Method for Manufacturing Wear-Resistant Member]

Next, a method for manufacturing the wear-resistant member of the present invention will be briefly described.

Figure 12:
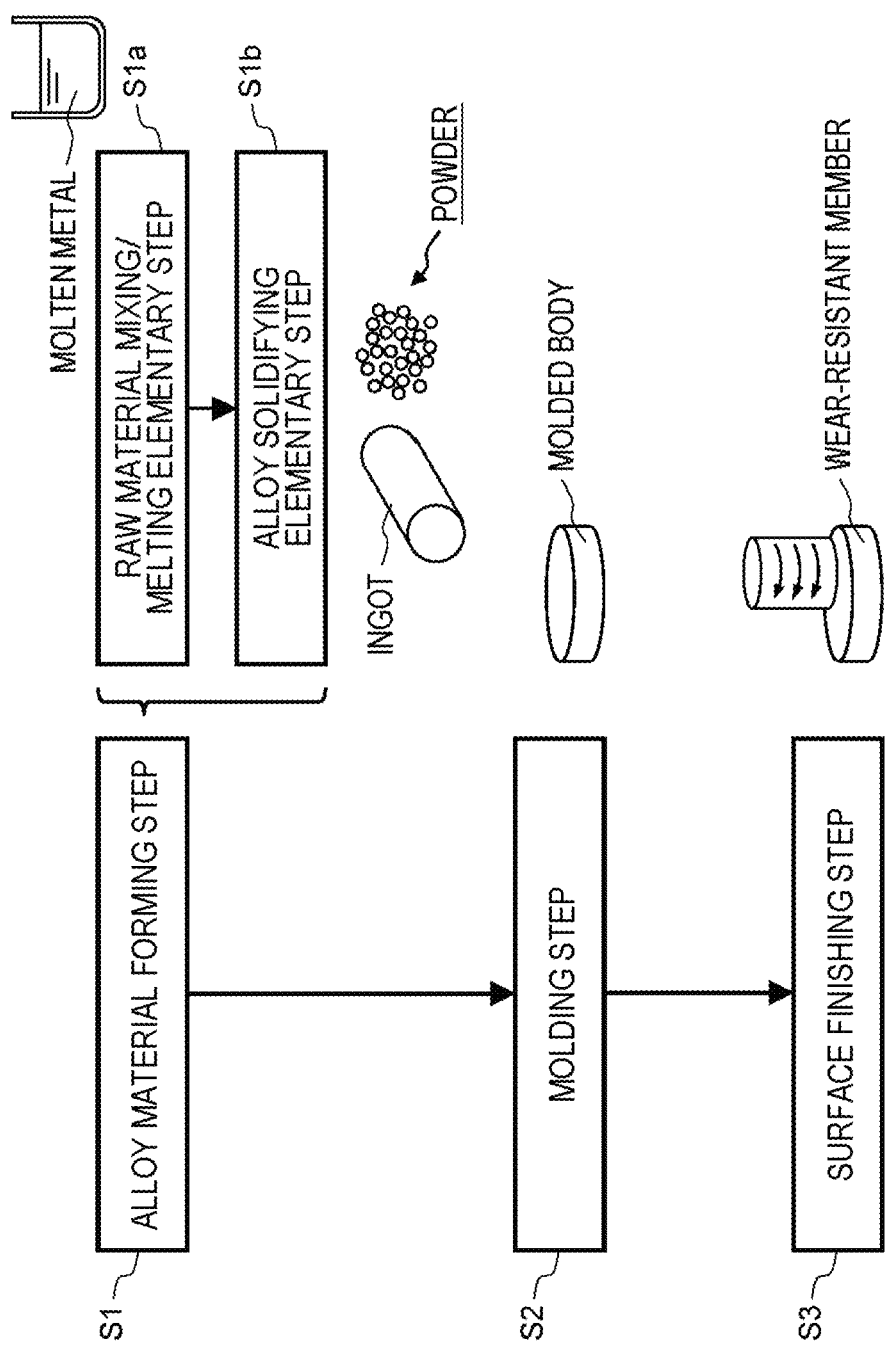
FIG. 12 is a process chart showing an example of a method for manufacturing the wear-resistant member (in a case where the entire wear-resistant member includes a Cr-based alloy material) according to the present invention.

FIG. 12 is a process chart showing an example of a method for manufacturing the wear-resistant member (in a case where the entire wear-resistant member includes a Cr-based alloy material) according to the present invention. As illustrated in FIG. 12, first, an alloy material forming step S1 of preparing a Cr-based alloy material to be a base of the wear-resistant member is performed. As long as a Cr-based alloy material capable of forming a desired wear-resistant member is produced, the detailed procedure of the alloy material forming step S1 is not particularly limited, but includes, for example, a raw material mixing/melting elementary step S1a of mixing and melting raw materials to have a desired alloy composition and forming a molten metal, and an alloy solidifying elementary step S1b of solidifying/hardening the molten metal to prepare a Cr-based alloy material.

In order to further reduce the content rate of the impurity component in the alloy (refine the alloy), the raw material mixing/melting elementary step S1a may further include, after a raw material alloy ingot forming elementary step of once solidifying molten Cr-based alloy to form a raw material alloy ingot, a remelting elementary step of remelting the raw material alloy ingot to prepare a cleaned molten metal. There is no particular limitation on the remelting method as long as the cleanliness of the alloy can be improved, but for example, vacuum arc remelting (VAR) can be preferably used.

The detailed procedure of the alloy solidifying elementary step S1b is not particularly limited as long as it is possible to produce a Cr-based alloy material in a form (e.g., ingot or powder form) suitable for use in a molding step S2 as the next step, but for example, a casting method or an atomizing method can be preferably used.

In the case of preparing a rod-shaped, wire-shaped, or tape-shaped Cr-based alloy material, it is preferable to perform an alloy ingot forming elementary step of forming a Cr-based alloy ingot using the casting method, and then perform a plastic working elementary step of subjecting the alloy ingot to plastic working so as to produce a desirably-shaped Cr-based alloy material. In the case of producing a Cr-based alloy material in powder form, an atomizing step (e.g., gas atomization or centrifugal atomization for obtaining spherical particles) is performed, and then a classifying elementary step for adjusting the particle size to be within a desired particle size range may be performed. The classifying elementary step is not an essential step, but is preferably performed from the viewpoint of improving the utility of the Cr-based alloy powder.

Next, the molding step S2 of forming a molded body having a desired shape is performed using the Cr-based alloy material obtained in the alloy material forming step S1. The molding method is not particularly limited as long as a molded body having a desired shape can be formed. For example, when the Cr-based alloy material is an ingot, it is possible to appropriately use plastic working (such as hot working or cold working) or machining (such as punching or cutting). Further, when the Cr-based alloy material is a powder, it is possible to preferably use a powder metallurgy process.

Next, a surface finishing step S3 of subjecting the molded body of the Cr-based alloy formed in the molding step S2 to surface finishing is performed. The surface finishing method is not particularly limited, and it is possible to appropriately use conventional methods (e.g., grinding, polishing, etc.).

Figure 13:
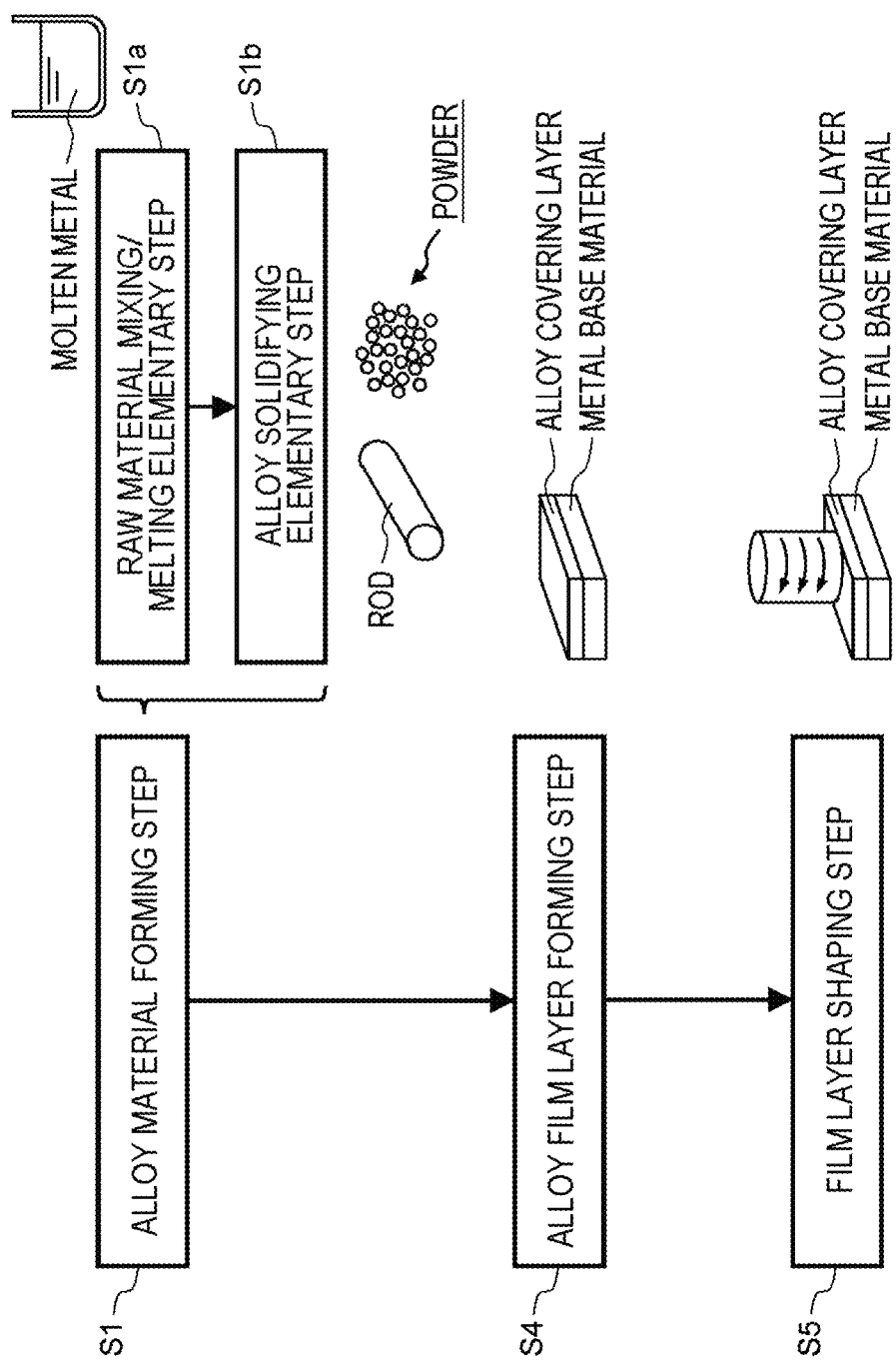
FIG. 13 is a process chart showing an example of a method for manufacturing the wear-resistant member (in a case where a covering layer including the Cr-based alloy material is formed on a metal base material) according to the present invention.

FIG. 13 is a process chart showing an example of a method for manufacturing the wear-resistant member (in a case where a covering layer including the Cr-based alloy material is formed on a metal base material) according to the present invention. In order to avoid duplication of description, only portions different from the steps described in FIG. 12 will be described.

An alloy covering layer forming step S4 is a step of forming a Cr-based alloy material covering layer at a desired position on a metal base material using the Cr-based alloy material obtained in the alloy material forming step S1. The method for forming the alloy covering layer is not particularly limited as long as a desired Cr-based alloy material covering layer can be formed, but for example, a buildup welding method or a thermal spraying method can be preferably used.

The buildup welding method is not particularly limited, and it is possible to appropriately use conventional methods (e.g., a shielded arc welding method, a $CO_2$ welding method, a metal active gas (MAG) welding method, a metal inert gas (MIG) welding method, a tungsten inert gas (TIG) welding method, a submerged arc welding method, and a plasma transferred arc (PTA) welding method). Further, the thermal spraying method is not particularly limited, and it is possible to appropriately use conventional methods (e.g., a flame spraying method, a high-speed flame spraying method, an arc spraying method, a plasma spraying method, a cold spraying method, etc.).

In addition, the material of the metal base material is not particularly limited, but a steel material can be preferably used from the viewpoint of mechanical strength and cost required for the final wear-resistant member. When the mechanical strength at high temperatures is more prioritized, for example, an Ni-based alloy material may be used as the material of the metal base material. The thickness of the covering layer is also not particularly limited, and may be appropriately selected according to the application of the final wear-resistant member. For example, the thickness is preferably in a range of 2 mm or more and 20 mm or less.

Next, an alloy covering layer shaping step S5 of subjecting the Cr-based alloy covering layer formed in the alloy covering layer forming step S4 to final shaping is performed.

The shaping method is not particularly limited, and it is possible to appropriately use conventional methods (e.g., cutting, grinding, and polishing). The alloy covering layer shaping step is not an essential step, but is preferably performed from the viewpoint of the shape and dimension accuracy required for the final wear-resistant member.

EXAMPLES

Hereinafter, the present disclosure will be described more specifically with reference to Examples and Comparative Examples. Note that the present invention is not limited to these Examples.

Experiment 1

Production of Examples 1 and 2 and Comparative Examples 1 to 3

Raw materials were mixed and melted by radio frequency melting (at a melting temperature of 1500° C. or higher in a reduced-pressure Ar atmosphere) to form molten metals with each nominal alloy composition shown in Table 1, and then the molten metals each were subjected to a metal mold casting method using a copper mold to produce cylindrical molded bodies (20 mm in diameter and 50 mm in length).

TABLE 1

Nominal alloy composition of samples of Examples 1 and 2 and Comparative Examples 1 to 3

| Sample | Alloy powder | Nominal alloy composition (mass %) | | | | | | | | | | |
|---|---|---|---|---|---|---|---|---|---|---|---|---|
| | | Cr | Ni | Fe | Nb | Ti | C | Mn | W | Mo | Si | Co |
| Example 1 | AP-1 | 51.3 | 25.1 | 16.4 | 6.0 | 0.25 | 0.75 | 0.2 | — | — | — | — |
| Example 2 | AP-2 | 50.0 | 24.5 | 16.0 | 8.0 | 0.3 | 1.0 | 0.2 | — | — | — | — |
| Comparative Example 1 | AP-3 | 50.0 | 24.8 | 16.0 | 8.0 | — | 1.0 | 0.2 | — | — | — | — |
| Comparative Example 2 | AP-4 | 28.5 | 1.0 | 1.0 | — | — | 1.2 | — | 4.6 | 0.5 | 1.0 | 62.2 |
| Comparative Example 3 | AP-5 | 27.5 | 2.6 | 1.0 | — | — | 0.25 | — | — | 5.4 | 1.0 | 62.3 |

A hyphen indicates that the material was not intentionally included.

A-1 and A-2 are Co-based alloy materials that have a composition satisfying the alloy composition of the present invention, A-3 is a Co-based alloy material (not containing the Ti component) that has a composition deviating from the alloy composition of the present invention, and A-4 and A-5 are commercially available Co-based alloy materials. In Table 1, the content rate (unit: mass %) of each component is converted so that the sum of the described components is 100 mass %. The total content of impurities (N, O, P, and S) was confirmed to be 0.1 mass % or less and included in the content rate of the main components.

Plate materials (15 mm×20 mm×2 mm) were cut out from the cylindrical molded body prepared above, and subjected to surface polishing to produce test evaluation samples of Examples 1 and 2 and Comparative Examples 1 to 3.

Experiment 2

Investigation of Examples 1 and 2 and Comparative Examples 1 to 3

For the test evaluation samples of Examples 1 and 2 and Comparative Examples 1 to 3 produced in Experiment 1, the microstructure observation of the alloy material and the evaluation of the wear resistance test were performed.

(1) Microstructure Observation

A scanning electron microscope-energy dispersive X-ray analyzer SEM-EDX (S-4300SE, manufactured by Hitachi High-Technologies Corporation) was used for the microstructure observation, and a GNU image editing program (GIMP, free software) was used for the measurement of the area percentage of the constituent phase. FIG. 14 shows SEM observation images showing an example of a cross-sectional microstructure in the test evaluation sample of Example 2, and the images are a reflected electron image, a ferrite phase map, an Nb carbide phase map, and an austenite phase map, respectively. FIG. 1 described above shows the test evaluation sample of Example 1.

In the test evaluation sample of Example 2 shown in FIG. 14, as in FIG. 1, the parent phase includes a mixed phase of a ferrite phase (α phase) and an austenite phase (γ phase), and the Nb carbide phase is dispersed and precipitated in the parent phase. The Nb carbide phase is mainly precipitated in a dendritic/leaf vein form, and is precipitated in a granular form in some places. In the ratio of the constituent phases, the ferrite phase has an area percentage of 77.4%, the austenite phase has an area percentage of 10.5%, and the Nb carbide phase has an area percentage of 12.0%. The content rate of the Nb in Example 2 is higher than the content rate of the Nb in Example 1, and thus the ratio of the Nb carbide phase is high.

Figure 15:
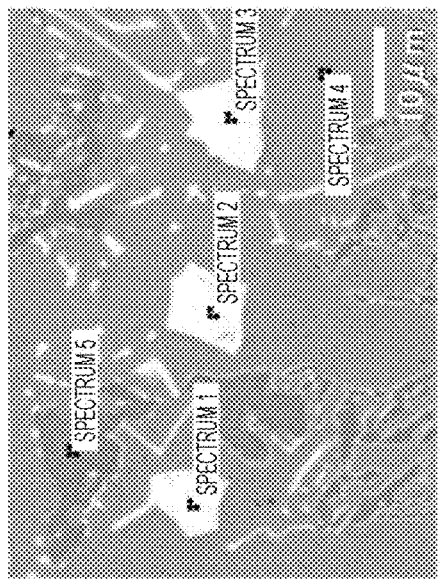
FIG. 15 shows a magnified view of reflected electron image and analysis results of elements of the test evaluation sample of Example 2.

FIG. 15 shows a magnified view of reflected electron image and analysis results of elements of the test evaluation sample of Example 2. As shown in FIG. 15, it is found that the granular Nb carbide phase has an average particle size of 10 μm or less. Further, the Ti component is not detected from the parent phase (α and γ phases), but is detected only from the Nb carbide phase, and it is strongly suggested that the Ti component is a starting point (species) for precipitation of the Nb carbide phase.

Although not shown, in comparison with Examples 1 and 2, in the test evaluation sample of Comparative Example 1, a coarse granular Nb carbide phase (average particle size: more than 10 μm) was confirmed to be precipitated. In Comparative Example 1, since the Cr-based alloy material did not contain the Ti component, it was considered that the number of starting points (species) for precipitation of the Nb carbide phase was reduced and the Nb carbide phase was coarsened.

Although not shown, the Nb component was not contained in the Co-based alloy material of the test evaluation samples of Comparative Examples 2 and 3, and thus the Nb carbide phase was not formed and precipitated, and instead, the Cr carbide phase was confirmed to be precipitated.

(2) Test and Evaluation of Wear Resistance

As a test of wear resistance, a friction-wear test (using a reciprocating friction wear tester: μ-100N, manufactured by Takachiho-Seiki. Co., Ltd.) for bringing test evaluation samples into contact with each other and allowing the samples to slide back and forth was performed to measure the friction coefficients. The measurement conditions were as follows: a surface pressure of 9.9 MPa and a slide stroke of 15 mm. Further, the number of cracks (cracks having a length of more than 5 μm) in the wear track (in the range of 1 cm in the direction orthogonal to the sliding direction) after the friction-wear test was examined using SEM.

With respect to the friction coefficient, a case where the fluctuation range in the range of 10 reciprocations to 30 reciprocations was "within ±0.01" was determined as "excellent", a case where the fluctuation range was "more than ±0.01 and within ±0.02" was determined as "acceptable", and a case where the fluctuation range was "more than ±0.02" was determined as "unacceptable". With respect to cracks in the wear track after the friction-wear test, a case where the density of cracks was "less than 5/cm" was determined as "excellent", a case where the density of cracks was "5/cm or more and less than 10/cm" was determined as "acceptable", and a case where the density of cracks was "10/cm or more" was determined as "unacceptable".

Furthermore, a Vickers hardness test (in accordance with JIS Z 2244 (2009)) was performed on the test evaluation samples (on each surface that was not the surface of the friction-wear test) to measure the Vickers hardness (HV). The hardness at seven points was measured (load: 1 kgf, holding time: 10 seconds) using a micro Vickers hardness tester (HMV, manufactured by Shimadzu Corporation), and the average of hardness values at five points, excluding the maximum and minimum Vickers hardness values from the hardness values at seven points, was taken as the Vickers hardness of the sample.

With respect to the Vickers hardness, the case of "600≤HV" was determined as "excellent", the case of "550≤HV" was determined as "acceptable", and the case of "HV<550" was determined as "unacceptable".

As for a comprehensive evaluation of the wear resistance, a case where all of the fluctuation range of the friction coefficient, the density of cracks in the wear track, and the Vickers hardness were determined to be an "acceptable" level or more was determined as "acceptable", and a case where any one of the above items was determined to be an "unacceptable" level was determined as "unacceptable". The results are summarized in Table 2.

TABLE 2

Tests and evaluation results of samples of Examples 1 and 2 and Comparative Examples 1 to 3

| Sample | Fluctuation range of coefficient of friction | | | | Crack density in wear track | | Vickers hardness | | Comprehensive evaluation |
|---|---|---|---|---|---|---|---|---|---|
| | 10 reciprocations | 20 reciprocations | 30 reciprocations | Determination | Number of cracks | Determination | HV | Determination | |
| Example 1 | 0.435 | 0.435 | 0.435 | Excellent | 0 | Excellent | 601 | Excellent | Acceptable |
| Example 2 | 0.44 | 0.42 | 0.43 | Excellent | 2 | Excellent | 608 | Excellent | Acceptable |
| Comparative Example 1 | 0.44 | 0.46 | 0.425 | Acceptable | 56 | Unacceptable | 587 | Acceptable | Unacceptable |
| Comparative Example 2 | 0.62 | 0.59 | 0.53 | Unacceptable | 0 | Excellent | 471 | Unacceptable | Unacceptable |
| Comparative Example 3 | 0.575 | 0.645 | 0.61 | Unacceptable | 6 | Acceptable | 454 | Unacceptable | Unacceptable |

As shown in Table 2, as for the fluctuation range of the friction coefficient, Examples 1 and 2 are determined as "excellent", Comparative Example 1 is determined as "acceptable", and Comparative Examples 2 and 3 are determined as "unacceptable". A small fluctuation range of the friction coefficient means that the change in the surface state of the friction sliding surface is small. In addition, it can be seen that Examples 1 and 2 have friction coefficients smaller than friction coefficients of Comparative Examples 2 and 3. The small friction coefficient leads to a reduction in friction loss during operation in the mechanical device using the member.

Regarding the density of cracks in the wear track, Examples 1 and 2 and Comparative Example 2 are determined as "excellent", Comparative Example 1 is determined as "unacceptable", and Comparative Example 3 is determined as "acceptable". The fact that the density of cracks in the wear track is low means that the toughness is excellent. In Comparative Example 1, the precipitation of coarse granular Nb carbide phases was confirmed in the microstructure observation, and thus this is considered to be caused by the lack of the coarse granular Nb carbide phases during frictional sliding.

The Vickers hardness in Examples 1 and 2 are determined as "excellent", the Vickers hardness in Comparative Example 1 is determined as "acceptable", and the Vickers hardness in Comparative Examples 2 and 3 are determined as "unacceptable". It is confirmed that the Cr-based alloy material of the present invention has higher hardness than the conventional Co-based alloy material. High Vickers hardness leads to an improvement in wear resistance.

From these results, as the comprehensive evaluation of wear resistance, Examples 1 and 2 were determined as "acceptable", and Comparative Examples 1 to 3 were determined as "unacceptable".

Experiment 3

Production and Investigation of Examples 3 and 4 and Comparative Example 4

Based on the alloy composition of Example 2, Cr-based alloy materials (Examples 3 and 4 and Comparative Example 4, and A-6 to A-8) in which the mass ratio Ti/Nb was changed were prepared to investigate the influence of the mass ratio Ti/Nb in the alloy. Specifically, raw materials were mixed so as to have the nominal alloy composition shown in Table 3, and the resulting mixture was subjected to arc melting on water-cooled copper hearth (in a reduced-pressure Ar atmosphere) to form alloy ingots (diameter: 34 mm, about 50 g). At this time, in order to homogenize the alloy ingots, the remelting of each of the alloy ingots was repeated six times to produce samples.

TABLE 3

Nominal alloy composition of samples of Examples 3 and 4 and Comparative Example 4

| Sample | Alloy powder | Nominal alloy composition (mass %) | | | | | | | Mass ratio Ti/Nb |
| --- | --- | --- | --- | --- | --- | --- | --- | --- | --- |
| | | Cr | Ni | Fe | Nb | Ti | C | Mn | |
| Example 3 | AP-6 | 50.0 | 24.7 | 16.0 | 8.0 | 0.1 | 1.0 | 0.2 | 0.0125 |
| Example 4 | AP-7 | 50.0 | 24.3 | 16.0 | 8.0 | 0.5 | 1.0 | 0.2 | 0.0625 |
| Comparative Example 4 | AP-8 | 50.0 | 24.0 | 16.0 | 8.0 | 0.8 | 1.0 | 0.2 | 0.1 |

Microstructure observation was performed in the same manner as in Experiment 2 on the samples produced by cutting and polishing the alloy ingots of Examples 3 and 4 and Comparative Example 4.

Although not shown, when the alloy ingot samples of Examples 3 and 4 were compared with the test evaluation sample of Example 2, the number of granular Nb carbide phases precipitated tended to increase with an increase in the mass ratio Ti/Nb. Basically, a similar microstructure to that of the test evaluation sample of Example 2 (see FIG. 14) was observed.

Figure 16:
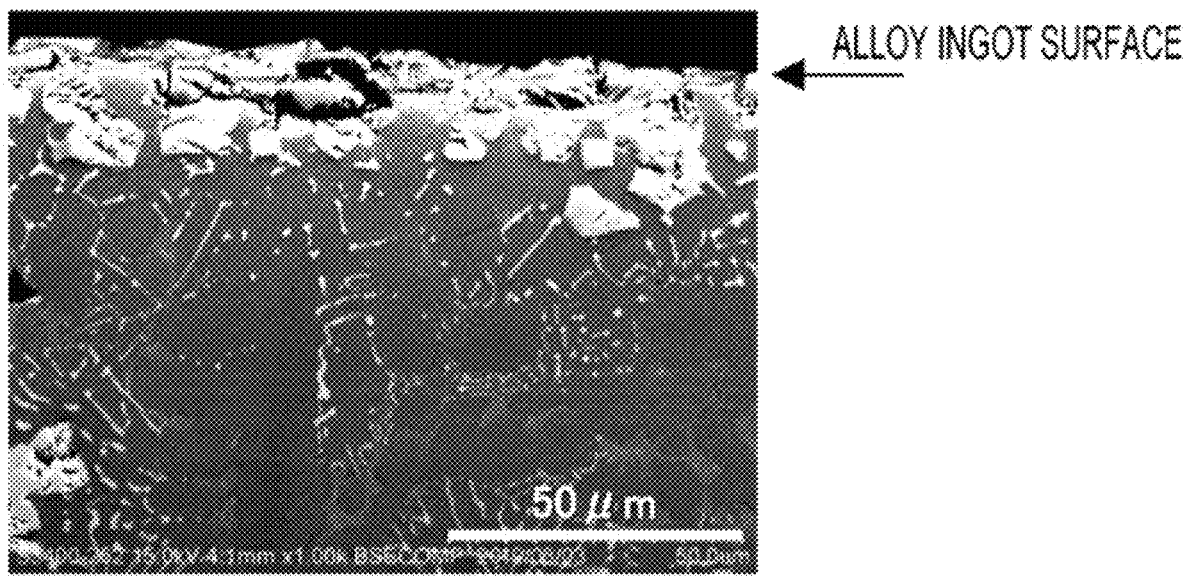
FIG. 16 is an SEM observation image showing an example of a cross-sectional microstructure in the vicinity of a surface of an alloy ingot of Comparative Example 4.

Meanwhile, the microstructure of the alloy ingot sample of Comparative Example 4 was different from those of Examples 2 to 4. FIG. 16 is an SEM observation image showing an example of a cross-sectional microstructure in the vicinity of a surface of an alloy ingot sample of Comparative Example 4. As shown in FIG. 16, it can be seen that the coarse granular Nb carbide phases (having an average particle size of more than 10 μm) are unevenly distributed in the surface region (surface region not in direct contact with water-cooled copper hearth, final solidified region) of the alloy ingot sample, and the amount of the Nb carbide phases precipitated decreases in the inner region of the alloy ingot sample.

As a factor of having such a microstructure, it is considered that the specific gravity of the Nb carbide phase particles decreased due to an increase in the content rate of the Ti in the Nb carbide phase particles, and thus the Nb carbide phase particles were floated (were pushed to the final solidified region) during solidification of the parent phase. Such a structure form is not preferred because when the surface of the cast body is ground to finish the surface of the wear-resistant member, the Nb carbide phase particles in the vicinity of the surface are scraped off, thereby making it difficult to control the amount of the Nb carbide phases precipitated on the surface of the final wear-resistant member (i.e., an inner region of the cast body).

The above-described embodiments and examples have been described to help understanding of the present invention, and the present invention is not limited only to the specific configurations described. For example, it is possible to replace a part of the configuration of an embodiment with a configuration on the basis of the technical common sense of those skilled in the art, and it is also possible to add the configuration on the basis of the technical common sense of those skilled in the art to the configuration of the embodiment. Hence, in the present invention, as for some of the configurations of the embodiments and examples of the present specification, another configuration can be added, and a part of the configuration can be deleted or replaced with another configuration, without departing from the technical idea of the invention.

REFERENCE SIGNS LIST 10 covering layer
100 gear mechanism
110 first gear
120 second gear
200 roller chain
210 chain plate
220 chain pin
230 chain roller
300 bearing device
310 bearing inner ring
320 bearing outer ring
400 pump device 410 flow path member
420 impeller
500 molding device
510 mold
600 fuel injection device
610 fuel injection valve
620 fuel injection valve seat body
700 valve device
710 valve box
720 valve rod
730 valve body
740 valve seat
750 flow path
800 valve device
810 valve box
820 valve body support
830 valve body
840 valve seat
850a, 850b flow path
900 valve device
910 valve box
920 valve rod
930 valve body
940 valve seat
950a, 950b flow path
960a pressing spring
960b upper spring bearing
960c lower spring bearing
1000 valve device
1010 valve box
1020 valve rod
1030 valve body
1040 valve seat
1050a, 1050b flow path

The invention claimed is:

1. A member using a Cr-based alloy material, wherein the Cr-based alloy material has an alloy composition consisting of:
more than 40 mass % and 65 mass % or less of Cr;
15 mass % or more and 40 mass % or less of Ni;
more than 10 mass % and 30 mass % or less of Fe;
5 mass % or more and 16 mass % or less of Nb;
0.1 mass % or more and 0.9 mass % or less of Ti;
0.6 mass % or more and 2.5 mass % or less of C;
2 mass % or less of Mn;
0.1 mass % or more and 5 mass % or less of Cu;
0.1 mass % or more and 1 mass % or less of Si;
0.02% or more and 0.3 mass % or less of Sn;
0.005 mass % or more and 0.05 mass % or less of Al; and
1 mass % or less of impurities, and
wherein in the alloy composition, a content rate of the Ni is higher than a content rate of the Fe,
a mass ratio C/Nb of the Nb and the C is 0.11 or more and 0.16 or less, and
a mass ratio Ti/Nb of the Nb and the Ti is 0.0062 or more and 0.063 or less.

2. The member according to claim 1, wherein the Cr-based alloy material has a ferrite phase as a main phase, and an Nb carbide phase having a dendritic and granular form is precipitated in a total area percentage of 4% or more and 30% or less.

3. The member according to claim 1, wherein the member is entirely formed of the Cr-based alloy material.

4. The member according to claim 1, wherein the member is obtained by forming a covering layer including the Cr-based alloy material on a metal base material, and a surface layer region of the covering layer has the alloy composition.

5. The member according to claim 4, wherein the covering layer has a thickness of 2 mm or more and 20 mm or less.

6. The member according to claim 4, wherein the covering layer is a buildup-welded layer.

7. The member according to any one of claim 4, wherein the metal base material is made of a steel material.

8. The member according to claim 1, wherein the member is a sliding member, a rolling member, or a valve member.

9. A mechanical device comprising:
a sliding member;
a rolling member; or
a valve member,
wherein the sliding member, the rolling member, or the valve member is the member according to claim 1.

* * * * *